(12) United States Patent
Micali

(10) Patent No.: US 12,506,621 B2
(45) Date of Patent: *Dec. 23, 2025

(54) SECURING CRYPTOGRAPHIC KEYS

(71) Applicant: Silvio Micali, Brookline, MA (US)

(72) Inventor: Silvio Micali, Brookline, MA (US)

( * ) Notice: Subject to any disclaimer, the term of this patent is extended or adjusted under 35 U.S.C. 154(b) by 86 days.

This patent is subject to a terminal disclaimer.

(21) Appl. No.: 18/270,936

(22) PCT Filed: Jan. 19, 2021

(86) PCT No.: PCT/US2021/013870
§ 371 (c)(1),
(2) Date: Jul. 5, 2023

(87) PCT Pub. No.: WO2022/159072
PCT Pub. Date: Jul. 28, 2022

(65) Prior Publication Data
US 2024/0089120 A1    Mar. 14, 2024

(51) Int. Cl.
*H04L 9/32* (2006.01)
(52) U.S. Cl.
CPC .......... *H04L 9/3263* (2013.01); *H04L 9/3247* (2013.01); *H04L 9/3278* (2013.01)
(58) Field of Classification Search
None
See application file for complete search history.

(56) References Cited

U.S. PATENT DOCUMENTS

| 5,478,990 A | 12/1995 | Montanari et al. |
| 7,681,103 B2 | 3/2010 | Devadas et al. |

(Continued)

FOREIGN PATENT DOCUMENTS

| CN | 10 142 2015 A | 4/2009 |
| CN | 10 184 7296 A | 9/2010 |

(Continued)

OTHER PUBLICATIONS

Japanese Office Action Dated Nov. 21, 2024.

(Continued)

*Primary Examiner* — Jeffrey C Pwu
*Assistant Examiner* — Mayasa A. Shaawat
(74) *Attorney, Agent, or Firm* — Westborough IP Group, LLC

(57) ABSTRACT

A security device includes a covering device that, in response to an input signal, consistently provides a same random output signal that varies according to the microstructure of the covering device, where altering the microstructure of the covering device alters the random output signal, a key generation component that generates a secret key based on the random output signal, and a digital signature component that produces a digital signature of a message received by the security device using the secret key. The covering device surrounds at least a portion of the key generation component and the digital signature component to prevent access thereto and where accessing any of the components alters the microstructure of the covering device to alter the random output signal. The security device may be attached to an object and detaching the security device from the object may alter the microstructure of the covering device.

23 Claims, 14 Drawing Sheets

(56) References Cited

U.S. PATENT DOCUMENTS

| | | |
|---|---|---|
| 8,029,320 B1 | 10/2011 | Lustig et al. |
| 9,116,491 B2 | 8/2015 | Murakata |
| 9,246,686 B1 | 1/2016 | Holland et al. |
| 10,523,443 B1 * | 12/2019 | Kleinman ............... H04L 9/30 |
| 10,607,234 B2 | 3/2020 | Micali |
| 10,803,374 B2 * | 10/2020 | Micali .................. G06F 21/86 |
| 2008/0282206 A1 | 11/2008 | Anderson et al. |
| 2009/0008924 A1 | 1/2009 | Ophey et al. |
| 2009/0282259 A1 | 11/2009 | Skoric et al. |
| 2010/0073147 A1 | 3/2010 | Guajardo Merchan et al. |
| 2010/0250936 A1 | 9/2010 | Kusakawa et al. |
| 2011/0099117 A1 | 4/2011 | Schepers et al. |
| 2012/0033810 A1 | 2/2012 | Devadas et al. |
| 2013/0047209 A1 | 2/2013 | Satoh et al. |
| 2013/0127442 A1 | 5/2013 | Satoh et al. |
| 2013/0147511 A1 | 6/2013 | Koeberl et al. |
| 2013/0246809 A1 | 9/2013 | Beckmann et al. |
| 2013/0246881 A1 | 9/2013 | Goettfert et al. |
| 2014/0091832 A1 | 4/2014 | Gotze et al. |
| 2014/0108786 A1 | 4/2014 | Kreft |
| 2014/0266296 A1 | 9/2014 | Wang et al. |
| 2014/0334622 A1 | 11/2014 | Smyth et al. |
| 2015/0161415 A1 | 6/2015 | Kreft |
| 2015/0183257 A1 | 7/2015 | Glendenning et al. |
| 2017/0330200 A1 | 11/2017 | Micali et al. |
| 2018/0167211 A1 | 6/2018 | Falk et al. |
| 2018/0211264 A1 | 7/2018 | Micali |
| 2019/0026724 A1 | 1/2019 | Wade et al. |
| 2019/0236427 A1 | 8/2019 | Micali |
| 2019/0325171 A1 | 10/2019 | Obermaier et al. |
| 2020/0076624 A1 | 3/2020 | Cambou |
| 2020/0104101 A1 | 4/2020 | Satpathy et al. |
| 2020/0195447 A1 | 6/2020 | Shin |

FOREIGN PATENT DOCUMENTS

| | | |
|---|---|---|
| CN | 10 207 7205 A | 5/2011 |
| CN | 10 281 2472 A | 12/2012 |
| CN | 10 334 5690 A | 10/2013 |
| EP | 2 230 793 A2 | 9/2010 |
| JP | 2004-516706 A | 6/2004 |
| JP | 2008-541260 A | 11/2008 |
| JP | 2011-526113 A | 9/2011 |
| JP | 2011-198317 A | 10/2011 |
| JP | 2014-026227 A | 2/2014 |
| JP | 2013-0147511 A | 2/2015 |
| JP | 2015-023301 A | 2/2015 |
| JP | 2019-530271 | 10/2019 |
| WO | WO 2009/156904 A1 | 12/2009 |
| WO | WO 2016/073041 A1 | 5/2016 |
| WO | WO 2017/023831 A1 | 2/2017 |
| WO | WO 2018/031437 A1 | 2/2018 |

OTHER PUBLICATIONS

Vincent Immler, et al., "Secure Physical Enclosures from Covers with Tamper-Resistance", https://doi.org/10.13154/tches.v2019.11.51-96, vol. 2019, Issue 1, Nov. 9, 2018.

International Preliminary Report on Patentability Dated Aug. 3, 2023.

Srinivas Devadas, et al., "Design and Implementation of PUF-Based "Unclonable" RFID ICs for Anti-Counterfeiting and Security Applications," 2008 IEEE International Conference on RFID, Apr. 16-17, 2008.

Chiraag S. Juvekar, et al., "A Keccak-Based Wireless Authentication Tag with per-Query Key Update and Power-Glitch Attack Countermeasures," 16.2, ISSCC 2016 / Session 16 / Innovations in Circuits and Systems Enabled by Novel Technologies.

Saloomeh Shariati, "Image-based Physical Unclonable Functions for Anti-counterfeiting," PhD thesis, Feb. 1, 2013, pp. 93-103, URL:https://dial.uclouvain.be/pr/boreal/object/boreal:124681/datastream/PDF_01/view.

Japanese Office Action Dated Jul. 30, 2025.

* cited by examiner

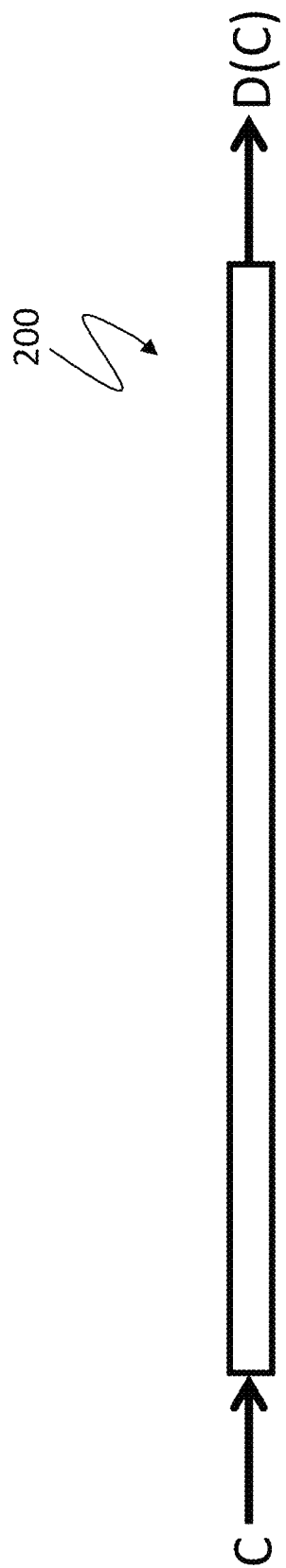

SECURING CRYPTOGRAPHIC KEYS

TECHNICAL FIELD

This application relates to the field of counterfeit prevention and more particularly to the field securing cryptographic keys to prevent improper disclosure thereof.

BACKGROUND OF THE INVENTION

In the digital world, security often depends on maintaining the secrecy of some keys. For example, a digital signature scheme consists of three fast algorithms: a key generator, G, a signing algorithm, S, and a verification algorithm, V. Given a random string r as an input, a user x uses G to produce a pair of keys (i.e., strings): a "public" key PKx and a "secret" signing key SKx. A public key does not "betray" its corresponding secret key. That is, even given knowledge of PKx, no one other than x is able to compute SKx in less than astronomical time. User x uses SKx to digitally sign messages. For each possible message (binary string) m, x runs an algorithm S on inputs m and SKx in order to produce a string, SIGx(m), referred to as x's digital signature of m.

In some cases, m may be retrievable from SIGx(m). If m cannot be retrieved from SIGx(m), it is possible to redefine the digital signature of party x of a message m to consist of the pair (m, SIGx(m)). Anyone knowing PKx can use PKx to verify the signatures produced by x. Specifically, on inputs (a) the public key PKx of a user x, (b) a message m, and (c) an alleged digital signature, s, of x for the message m, the verification algorithm V outputs either YES or NO, so as to satisfy the following properties:

1. Legitimate signatures are always verified: If s=SIGx (m) then V (PKx, m, s)=YES; and
2. Digital signatures are very hard to forge: without knowledge of SKx, if x has never signed m, finding a string s such that V (PKx, m, s)=YES requires an astronomical amount of time.

To prevent anyone else from signing messages on his behalf, a user x must keep his signing key SKx secret (hence the term "secret key"), and to enable anyone to verify the messages he does sign, x must make his verification key PKx public (hence the term "public key"). Needless to say, in a properly designed digital signature scheme, not only a public key PKx does not betray its matching secret key SKx, but also the random input r used by the key generator G to produce both keys. Otherwise, after discovering r, anyone could run the key-generating algorithm again on input r, so as to output and learn SKx and PKx.

In many situations, the secrecy of a key SK may be provided by storing SK in a signature-computing hardware device (e.g., a computer chip) that is under control of the owner (e.g., at home), away from potential adversaries. In other instances, however, the signature-computing hardware device cannot be stored in a safe environment. For instance, in some cases the signature-computing hardware device is attached to a product that is transported across the nation. Accordingly, it is possible for the signature-computing hardware device to fall into the hands of a malicious user who will try to read the secret key SK contained in the signature-computing hardware device.

One way to address this issue is to store SK in a so-called "tamper-proof chip". However, most tamper-proof chips are not absolutely tamper-proof, but instead are merely tamper resistant. A tamper-proof chip may be surrounded by an outer layer that prevents intruders from accessing a secret key stored inside without destroying SK in the process. In reality, such layers are not fool proof: they only make it more expensive to read SK. With the right apparatus, a malicious user may insert a probe and read SK without destroying SK.

Accordingly, it is desirable to provide a mechanism that prevents secret keys from being determined by a malicious user or other unauthorized entity.

SUMMARY OF THE INVENTION

According to the system described herein, a security device includes a covering device that, in response to an input signal, consistently provides a same random output signal that varies according to the microstructure of the covering device, where altering the microstructure of the covering device alters the random output signal, a key generation component that generates a secret key based on the random output signal, and a digital signature component that produces a digital signature of a message received by the security device using the secret key, where the covering device surrounds at least a portion of the key generation component and the digital signature component to prevent access thereto and where accessing any of the components alters the microstructure of the covering device to alter the random output signal. The security device may also include a protective layer disposed on one or more outer surfaces of the security device to prevent the microstructure of the covering device from being altered under normal use of the security device. The protective layer may be used to attach the security device to an object and wherein detaching the security device from the object alters the microstructure of the covering device. The security device may be attached to an object and detaching the security device from the object may alter the microstructure of the covering device. An entity may digitally sign a public key corresponding to the secret key together with additional information that specifies the input signal to the covering device and/or information about the object. The object may be a banknote, a consumer item, a manufactured component, a pharmaceutical product, an alimentary product, and/or a packet with content. Additional security devices may be attached to the object. An entity may digitally sign a public key corresponding to the secret key together with some information and a digital signature of the entity together with the security device may constitute a given monetary value. The secret key may exist only long enough to sign the message. The input signal may be authenticated by an entity. The security device may include a Faraday cage disposed about the security device. The key generation component may also generates a public key corresponding to the secret key. The security device may output the public key. The input signal may be one of a plurality of challenge values stored in the security device. One of the input signals may be chosen according to an internal counter of the security device. The security device may include a transformation component disposed between the covering device and the key generation component. The transformation component may use a cryptographic hash function or an identity function to transform the random value signal. The security device may run unrelated computations when digitally signing a message.

According further to the system described herein, digitally signing a message includes providing the message to a security device having a covering device that, in response to an input signal, consistently provides a same random output signal that varies according to the microstructure of the covering device, where altering the microstructure of the covering device alters the random output signal, the security device also having a key generation component that generates a secret key based on the random output signal and a digital signature component that produces a digital signature of a message received by the security device using the secret key, where the covering device surrounds at least a portion of the key generation component and the digital signature component to prevent access thereto and where accessing any of the components alters the microstructure of the covering device to alter the random output signal, providing a challenge value to the security device, and obtaining a digital signature from the security device.

The system described herein is an improvement over the user of PUVs and PUFs that is taught, for example, in U.S. Pat. Nos. 10,607,234 and 10,803,374 because neither of these patents teach how to prevent secret keys from being determined by a malicious user or other unauthorized entity. For example, if one were to simply wrap a PUV around a piece of hardware containing a secret key, similar to what is shown in FIG. 10 of U.S. Pat. No. 10,803,374, nothing securely ties the secret key to the PUV and so a malicious user could simply remove the PUV and, even if this dramatically changes the input-output behavior of the PUV, access the secret key. One way to address this is to provide a fixed input, C, to the PUV and then use the secret key to sign the output of the PUV, D(C), together with the message to produce SIGx(M, D(C)). This way, the PUV is tied to the signatures produced by the secret key. Yet, this also fails because a malicious user might still be able to destroy PUV and learn the secret key. Since the input C is the same for all messages to be signed, after learning D(C) from a prior signature, the malicious user can digitally sign any message M' by simply using the learned secret key to compute the signature SIGx(M', D(C)). This issue could be address by making C an unpredictable number instead of a constant. For example, C could be a one-way hash of the message M, i.e., H(M) so the output of the PUV is D(H(M)) and the signature is SIGx(M, D(H(M))). The problem with this approach, however, is that a user has no way of distinguishing D(H(M)) from, say, a random number. Accordingly, a malicious user may first destroy D in order to learn the secret, and then wrap a new PUV around the signing algorithm S with key secret key, so as to get a device that looks just as the genuine device that was destroyed, but provides a different output D'(C). When a new message M* is input, the new device produces the digital signature SIGx(M*, H(D'(M*)), but there's no way to detect that H(D'(M*)) is the wrong value and should have been H(D(M*)) because there's no way to detect that D'(M*) is an incorrect value (i.e., should have been D(M*)).

BRIEF DESCRIPTION OF THE DRAWINGS

Embodiments of the system described herein will now be explained in more detail in accordance with the figures of the drawings, which are briefly described as follows.

FIG. 2 is a schematic representation that shows a device that provides a Physically Unclonable Value (PUV) according to an embodiment of the system described herein.

DETAILED DESCRIPTION OF VARIOUS EMBODIMENTS

The system described herein uses a covering device that, in response to an input signal, consistently provides a same random value signal that varies according to the microstructure of the covering device. The covering device surrounds components of the system that sign digital messages so that unauthorized accessing any of the components alters the microstructure of the covering device and, ultimately, prevents generating an authorized private key and thus prevents signing any messages with an authorized private key.

Arbiter Circuits

Figure 1:
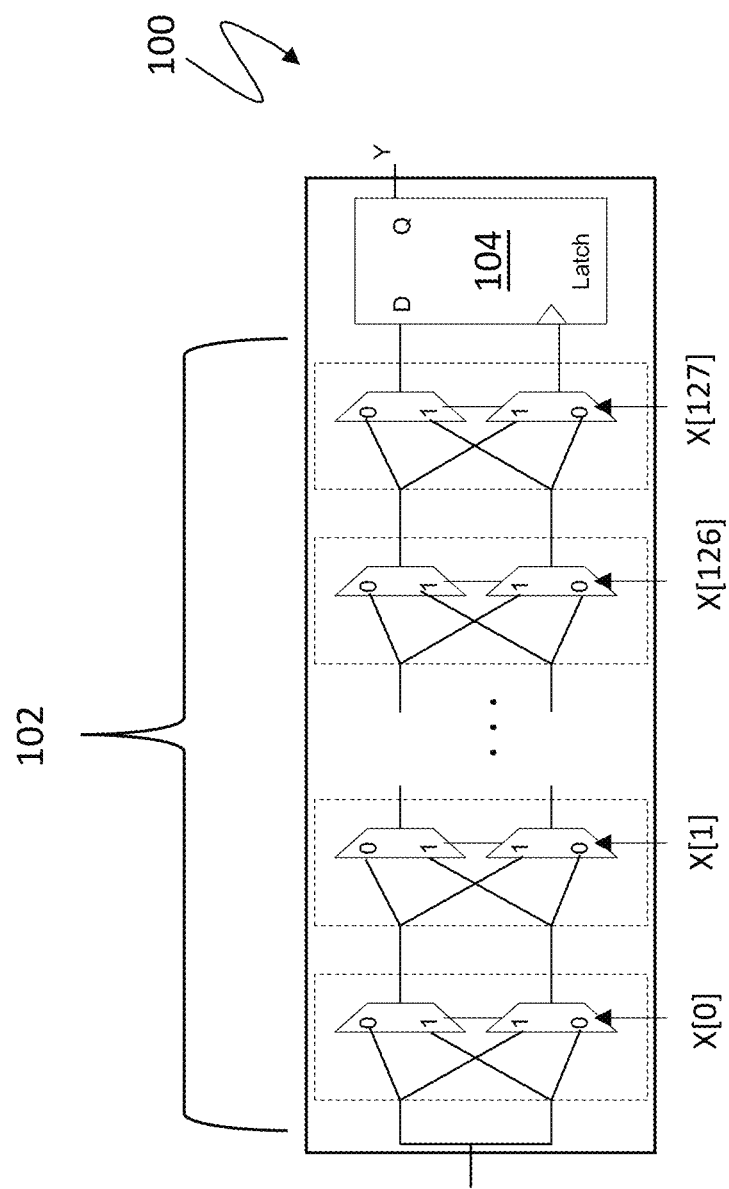
FIG. 1 is a schematic representation of an arbiter circuit according to an embodiment of the system described herein.

FIG. 1 shows an arbiter circuit 100 that includes several multiplexers 102 and a latch 104. The circuit 100 generates two different delay paths with the same layout length for each input X, and produces an output D(X) based on which path is faster. The output D(X) may be a single bit, but arbiter circuits may be augmented so that D(X) is a sufficiently long string. The resolution of the latch 104 may be sufficiently fine to ensure that, when given the same input X, the same output D(X) will be obtained, so long as the circuitry (microstructure) has not been altered (and the execution environment does not change significantly). Indeed, outputs of the circuit 100 may depend on the microstructure of the circuit 100, so that for each given output X, D(X) is a random value, and even a smallest alteration of the circuitry causes D(X) to become a different (and in fact random) output. In fact, the outputs on a same input of two arbiter circuits with the same layout may be vastly different, because the microstructures of the arbiter circuits are different.

Although an arbiter circuit consistently outputs a unique random value for each individual input, an input-output function D(X) of an arbiter circuit is not a random function. In fact, D(X) may be inferred given sufficiently many input-output pairs, which is not the case for a random function. For an extreme example of a function that is individually random but easily inferable, consider the function f so defined: let r be a random integer, set $f(0)=r$ and $f(x)=r+x$ for any x. Then, for any given input, f produces a random output. However, given any single input-out pair (i,f(i)), one can readily compute f's value at an arbitrary input x: indeed, $f(x)=f(i)-i+x$.

PUVs

U.S. Pat. No. 10,607,234 B2 (hereinafter, "the '234 Patent"), which is incorporated by reference herein, shows how to construct and use a PUV. Verbatim, a PUV is a physical device with an associated verification algorithm, A, mapping a pair of devices to YES and NO. Essentially if a circuit, D, is a PUV, then:
1. Individual randomness. The circuit D consistently produces a single random value in response to a single chosen input, and
2. Unclonability. It is hard to produce two devices D1 and D2, such that:
   (a) A(D1)=A(D2)=YES and
   (b) D1 and D2 produce the same value on the same chosen input c.

See, for example, FIG. 2 which is a schematic representation showing a device that provides a Physically Unclonable Value (PUV) D 200.

The '234 Patent also shows how to construct PUVs by properly exploiting the microstructure of electrical circuits such as arbiter circuits. In this example, the verification algorithm A essentially verifies that two devices really consist of arbiter circuits with the same layout.

PUFs

U.S. Pat. No. 10,803,374 B2 (hereinafter, "the '374 Patent"), which is incorporated by reference herein, teaches constructing and using a physically unclonable function (PUF). Essentially, a PUF is a device R whose input-output function in practice is a random function: not only is the output R(x) on an input x is random but is also unpredictable given the outputs, $R(x_1), \ldots, R(x_n)$, for any inputs $x_1, \ldots, x_n$ that are different from x.

The '374 Patent teaches constructing a PUF by constructing a device R that (a) includes a PUV D covering circuitry for a cryptographic hash H, and (b) on input x, outputs H(D(x)). Such a device R may be covered by a protective layer.

Figure 3A:
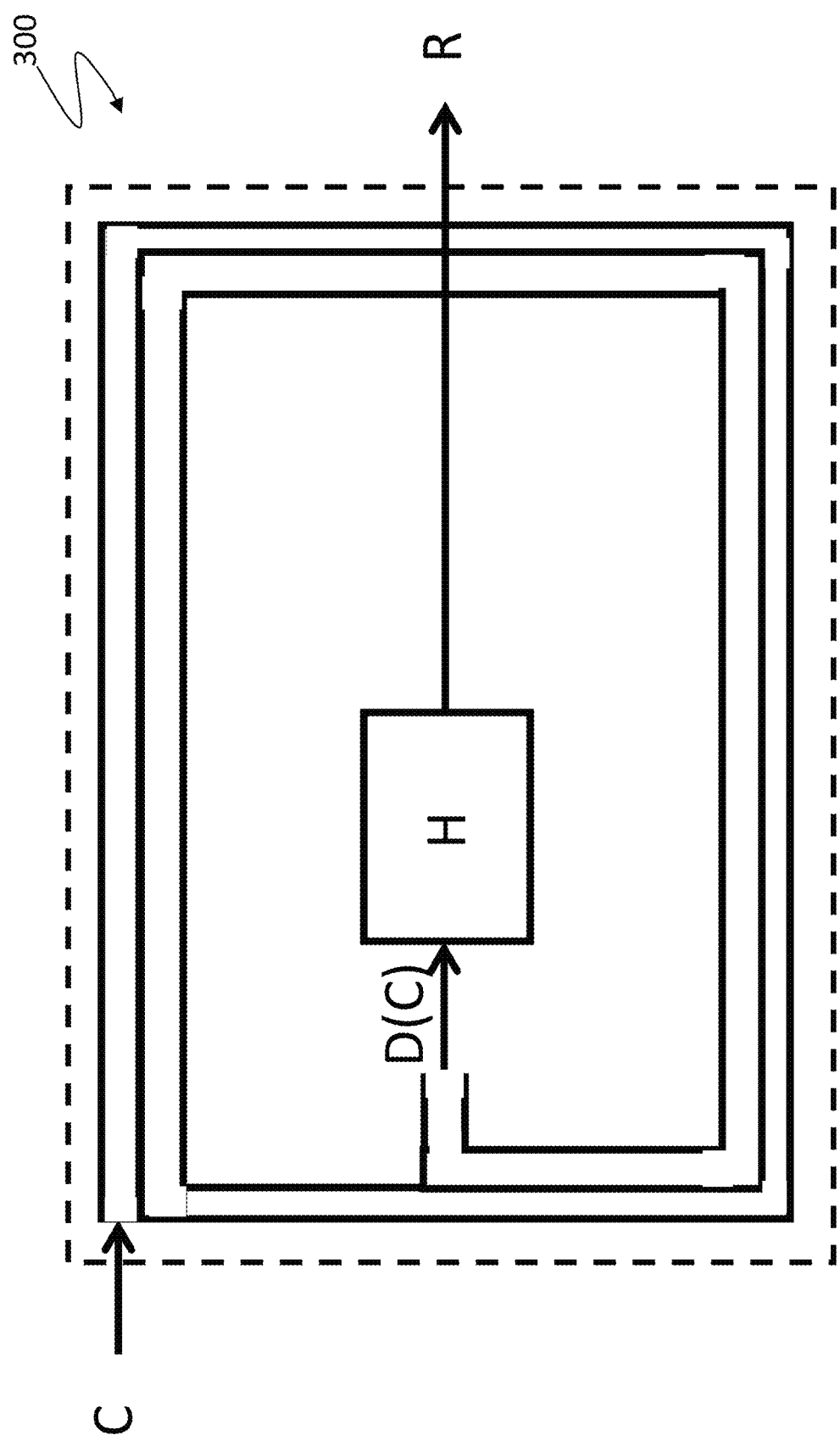
FIGS. 3A and 3B are schematic representations showing two-dimensional schematizations of devices that provide a Physically Unclonable Function (PUF) according to an embodiment of the system described herein.
Figure 3B:
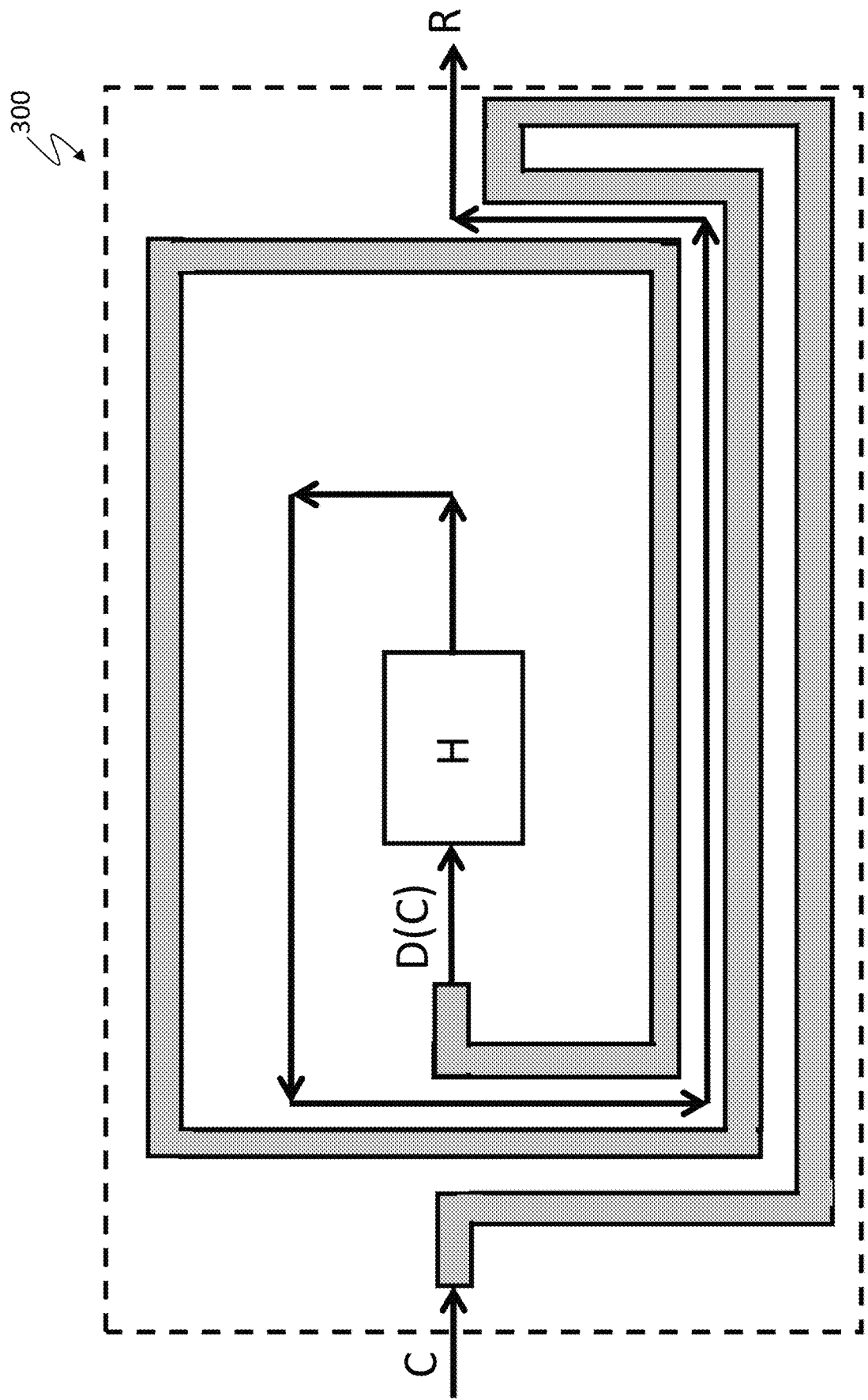

See, for example, FIGS. 3A and 3B, which illustrate different two-dimensional schematizations of PUFs 300, 300'.

1 PSK Devices

The system described herein provides physically secure key (PSK) devices that enable maintaining secrecy of a secret key SK of a cryptographic scheme, even though a corresponding PSK device is subjected to all kinds of physical attacks. In some cases, PSK devices may be constructed from much simpler devices than those described in the '234 and '374 Patents (discussed above), but in a very different way.

1.1 Weak PUVs

A weak PUV is a physical device D satisfying the following two properties:
1. Individual randomness. On any single input C, D consistently generates a unique random output D(C).
2. Blind unclonability. Without having an input-out pair generated by D, it is hard to find another device D' and an input C such that D(C)=D'(C).

Note that the blind unclonability property of a Weak PUV does not require the use of any verification algorithm A. This is so because D must only be hard to clone before seeing any of the outputs of D. As discussed below, the absence of such requirement is very beneficial.

Figure 4:
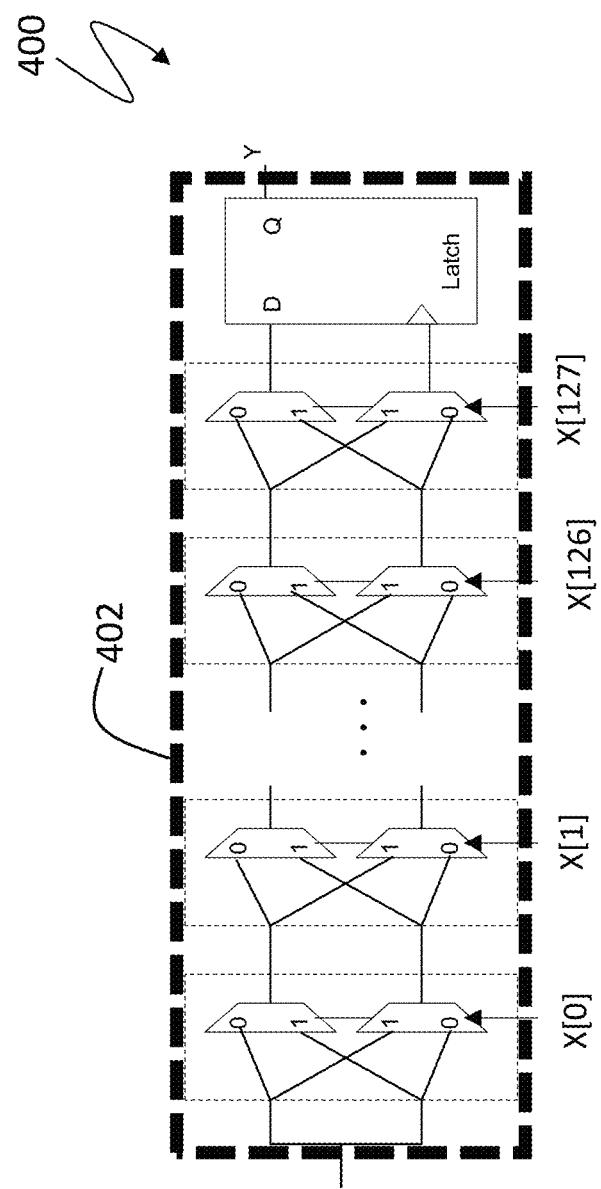
FIG. 4 is a schematic representation of a Weak PUV being implemented by a protected arbiter circuit according to an embodiment of the system described herein.

Referring to FIG. 4, a Weak PUV is shown as being implemented by a protected arbiter circuit 400. The protected arbiter circuit 400 is like the arbiter circuit 100, described above, except that the arbiter circuit 400 is surrounded by a protective layer 402 that prevents a microstructure of the arbiter circuit 400 from being altered by the wear and tear of normal use. The protective layer 402 may also be opaque.

Note that property 1 for a Weak PUV set forth above holds, because property 1 already holds for an ordinary (unprotected) arbiter circuit, like the arbiter circuit 100 of FIG. 1. As for property 2, since the output that the arbiter circuit 402 produces on any input is random, and since no input-output pair generated by the arbiter circuit 402 is given, it is essentially impossible to find a first protected arbiter circuit D, a second protected arbiter circuit D', and an input c with the guarantee that D'(c)=D(c). It is possible to manufacture another arbiter circuit D' (whether protected or not) having the same circuitry layout of D. Indeed, such a D' can be manufactured, without giving D any input c and observing the corresponding output D(c).

However, the microstructure of D' will necessarily be different from that of D, with the result that the input-output function D'(X) will be totally different from that of D. Accordingly, for any input c, it is statistically impossible that D(c)=D'(c).

Figure 5A:
FIGS. 5A and 5B are schematic representations of Weak PUVs with protecting layers shown as dotted lines according to embodiments of the system described herein.
Figure 5B:
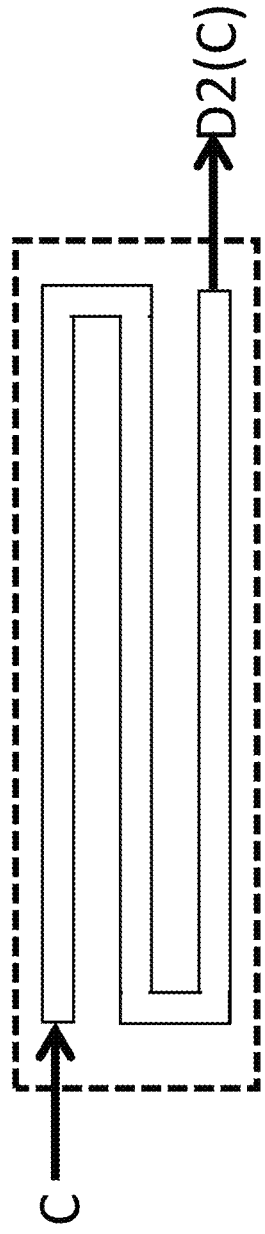

FIGS. 5A and 5B are schematic representations of Weak PUVs with protecting layers shown as dotted lines. A protecting layer could, for instance, be realized by a special glue that hardens after being applied and is nonconductive. Note that applying a protective layer to an arbiter circuit might alter the microstructure of the arbiter circuit. However, this is not a problem, because the input-output function of a protected arbiter circuit is taken to be the input-output function arising after the application of the protective layer. The protective layer of an arbiter circuit may follow the contour of the arbiter circuit, or be applied only around an outside surface of the arbiter circuit. Note that a protected arbiter circuit is just one example of a Weak PUV, and it is not a requirement that Weak PUVs be protected. The system described herein applies to Weak PUVs that are protected and that are unprotected.

PUVs Versus Weak PUVs

Note that an individual randomness property is the same for PUVs and Weak PUVs, but that the unclonability property of PUVs is much stronger than the blind unclonability enjoyed by Weak PUVs. This is explained in detail below:

For PUVs, the unclonability property requires that it must be difficult to come up with two devices D1 and D2 and an input c such that (a) A(D1, D2)=YES, for a specified verification algorithm A, and (b) D1(c)=D2(c). The unclonability requirement is very strong. In particular, the unclonability property also applies to the case of a malicious user who manufactures D1, uses D1 for a while, and then manufactures D2 and finds an input c for which both D1 and D2 produce the same output. This highlights an important role of a verification algorithm A, described in more detail elsewhere herein.

Consider an example of arbiter-circuit-based PUVs. Recall that an input-output function D1(x) of an arbiter circuit D1 may be easily inferred. Thus, after feeding D1 sufficiently many inputs and observing corresponding outputs of D1, a malicious user may construct a device D' having an input-out function that is identical to that of D1: that is, D'(x)=D1(x) for all x. Necessarily, however, the so constructed device D' is not an arbiter circuit with the same layout of D1. Thus, a proper verification algorithm A would easily reject such a pair of devices (D1, D'): that is, A(D1, D')=NO.

Note that a verification algorithm A, however, should be able to handle the following, more sophisticated scenario. Namely, a malicious user:
(1) obtains and experiments with an arbiter circuit D1, so as to infer an input-output function of D1(x);
(2) manufactures a (non-arbiter) device D' such that D'(x)=D1(x), that is as miniaturized as possible, so as to be hard to notice;
(3) constructs an arbiter circuit D2 with the same layout L of D1. (Note that, being the microstructure of D2 necessarily different from that of D1, D2(x) is necessarily different from D1(x))
(4) makes some cuts in wiring of D2 so as to prevent D2 from producing any output on any input.
(5) constructs a device D*, hiding the functioning miniaturized device D' in the crippled device D2, so that the input-output function of D* is that of D.

For the unclonability property to hold, the verification algorithm must reject also this pair of devices (D1, D*). In an embodiment of the '234 Patent, algorithm A verifies whether two devices D1 and D2 really consist of two arbiter circuits with the same layout. That is, it is not enough to verify that D1 and D2 generically have the same layout L, but that it is this very layout L that cause their input-output function. (In particular, A must verify that L has no cuts.) Indeed, only the latter verification enables A to reject the particular pair (D1, D*). This puts some significant constraints on the arbiter-circuit implementation of (ordinary) PUVs of the '234 Patent.

Note that for the verification algorithm A to be able to inspect (and compare) the layout L of an arbiter circuit D1 and confirm that D1 indeed uses L to implement the input-output function of D1, L must be exposed. The exposure potentially makes such an arbiter circuit a fragile device, because even a small alteration of L causes D1 to work in totally different and unpredictable ways. Accordingly, this fragility precludes applications in which the wear and tear of normal use may alter the layout L.

For Weak PUVs, the blind unclonability property is quite mild, and does not require the existence or use of an additional verification algorithm A. This is a main advantage, for several reasons. For example, relying on a verification algorithm A may make PUVs more expensive in many applications. Also, ensuring that A might be able to operate may make PUVs more fragile or nonapplicable in many settings.

The following shows how to construct three kinds of PSK devices: basic, authorized, and enhanced and a following section shows how to use PSK devices for a variety of applications, including unforgeable money, authenticating products, etc.

1.2 Basic Physically Secure Keys
Construction and Functionality

Figure 6A:
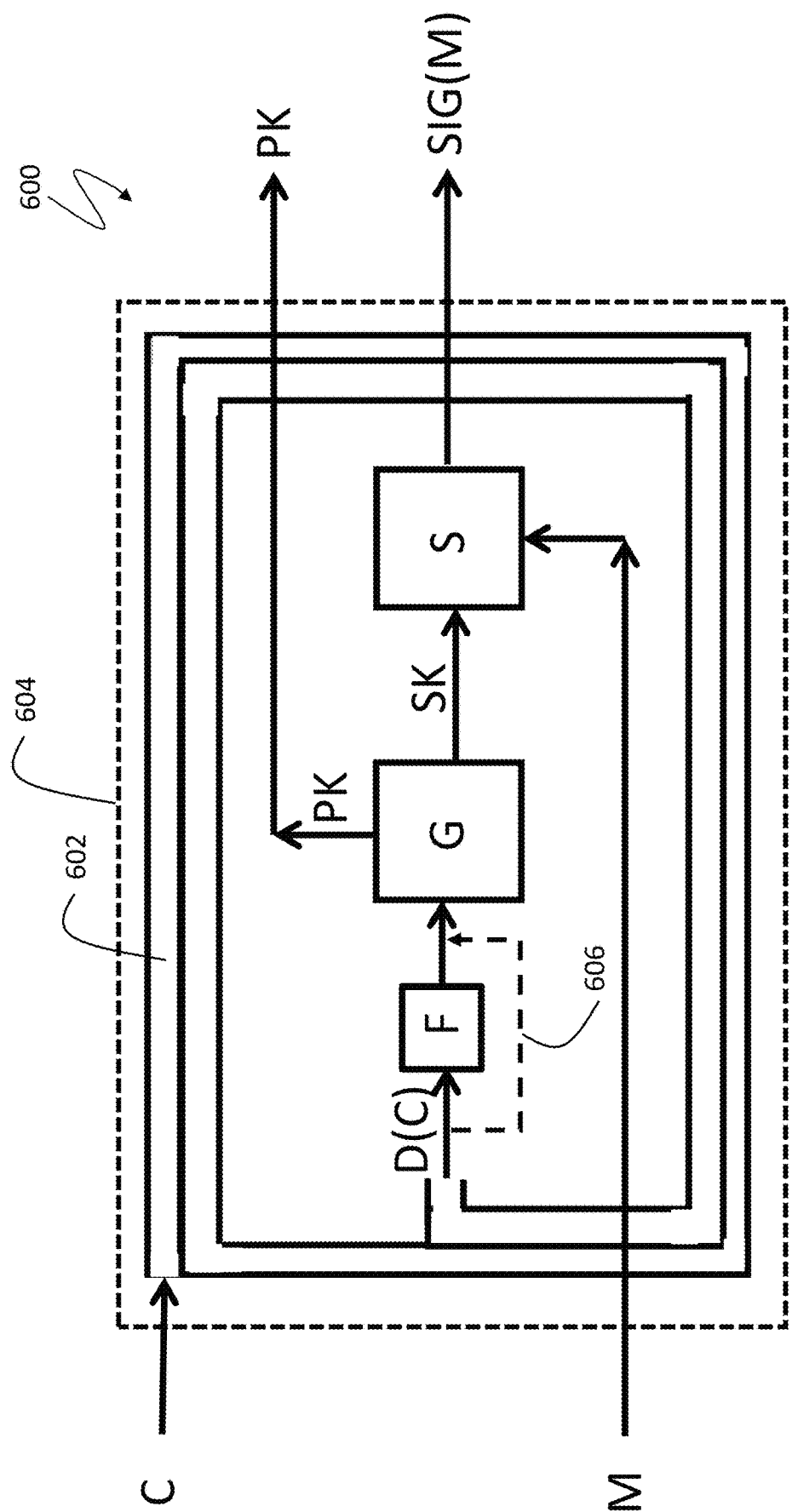
FIGS. 6A and 6B are schematic representations showing a physically secure key (PSK) device that is constructed with a covering that provides a Weak PUV input-output function according to embodiments of the system described herein.

Referring to FIG. 6A, a Physically Secure Key (PSK) device 600 is constructed with a Weak PUV 602 that covers at least an output, D(C), produced by the Weak PUV 602, an optional transformation component that includes hardware that implements a transforming function F, a key generation component that includes hardware that implements a key-generation algorithm G, and a digital signature component that includes hardware that implements a digital signature algorithm S of a digital signature scheme. The hardware may be conventional circuitry and/or a processing device that implements F, G and S. Reference herein to F, G, and S shall be understood to include the corresponding component/hardware for each. The Weak PUV 602 provides a covering that prevents accessing some values generated during a computation of the Weak PUV output, and prevents accessing F, G and S without altering the input-output function of the Weak PUV. The Weak PUV 602 may also be covered with a protective layer 604 that prevents accidentally "scratching" or more generically altering the input-output function of the Weak PUV, and/or that of G and S, under normal usage. This way, under normal usage, the Weak PUV continues to produce the same output whenever the same input is given. The transformation component that provides F is optional, which is illustrated by a dotted line 606 connecting the output D(C) from the Weak PUV 602 to the input of the key generation component G.

Recall that, given an input C, the Weak PUV consistently produces a given random value D(C). Also recall that the key-generation algorithm G is an algorithm that, given a random input, produces a public key and a matching secret key. Finally, recall that the signing algorithm S receives two inputs: a secret signing key and a message.

The PSK device 600 may receive two inputs, a challenge C (e.g., a fixed value) and a message M, which are used as follows:
The Challenge C is given as input to the Weak PUV, so as to produce a random output D(C) that is not stored but is provided to a transformation component, which may transform D(C) using a cryptographic hash function, the identity function, or any other function to provide a transformed signal. As mentioned above, the random output D(C) may be provided directly to the key generation component.
The transformed signal (or the output of the Weak PUV) is given as an input to hardware that provides the key-generation algorithm G, which in turn produces a verification key PK and a secret signing key SK corresponding to PK. The key PK may be directly output outside the PSK device, while SK is given as a first input to hardware that implements the signing algorithm S.
The message M is given as a second input to the hardware that implements the signing algorithm S. Thus, S produces a signature of M relative to the public key PK, SIG(M). The signature may be output from the PSK device.

Note that the key-generation algorithm G that, on a random input r, generates the matching keys PK and SK includes the case in which a first algorithm G1, on input r, generates a secret key SK, and a second algorithm G2, on input SK, generates the matching public key PK. (This case arises for the key generation algorithm of hash-based digital signature schemes, which may indeed be an embodiment of a digital signature scheme.) In this case, the public key PK may be generated and output only sometimes (e.g., during an initial process) and not other times (e.g., when the PSK device only outputs the signature of an input message). Indeed, these other times the algorithm G2 may be bypassed, while the secret key SK is directly fed by G1 to the signing algorithm S. Similarly, the algorithm G includes a case in which a first algorithm G1' produces, on a random input r, a public key PK and some additional information AI, and a second algorithm G2', on input AI (or AI and PK), outputs the matching secret key SK. In this case too, therefore, the PSK device 600 may produce and output PK only sometimes, and only the signature of an input message at other times.

The PSK device 600 may, for example, be used by a user to sign messages of the user. That is, the user can use the PSK device 600 to generate a public key PK, which the user publicizes as their own. The user may keep the PSK device at the home of the user—e.g., connected to the computer of the user—to sign any messages the user wants in a most secure way. Indeed, in many PKI applications, securing the secret keys is a main problem. The PSK device may be used by a CA in an X.509 certificate system (or similar) where the CA digitally signs user certificates.

Basic Security Analysis

Let us now analyze the security of the PSK device 600. First of all, when the PSK device 600 is not in use, the key SK does not even exist, which is the best way of keeping SK secret. When the PSK device 600 is used with inputs C and M, the key SK is conjured into existence only to be used as an input by the signing algorithm S, and will disappear as soon as the PSK device 600 stops being used. Should a malicious user insert a probe in the PSK device 600, so as to access SK while the PSK device 600 is used, the actions of the malicious user alter the microstructure of the Weak PUV 602, so that, on input C, the altered Weak PUV generates a totally different output, which in turn generates a key SK' totally different from SK. Thus, whatever the malicious user may read will be practically useless with respect to learning SK. Similarly, the malicious user is unable to learn the random value D(C), because the value of D(C) is also ephemeral and is briefly conjured up into existence inside the space totally covered by the Weak PUV 602 itself.

Variants

Different Handling of the Public Key PK

The public key PK produced by the key generator algorithm G of the PSK device 600 need not be externally output directly by the key generation algorithm G. For instance, without any limitation intended, once generated, PK could be stored in some long-term memory inside the PSK device 600, and externally output directly from there any time the public key is needed.

Power

The PSK device 600 may work via externally provided power, or internal power, such as a battery. The external power may be provided continually or during time of use only. In particular, power may be provided, possibly in a contactless manner, by the very device that provides the inputs C and M to the PSK device 600.

Variable Challenges

The challenge C need not be the same fixed value for all PSK devices. Different PSK devices may use different challenges for generating the random inputs to the key generation algorithm. In this case, a particular challenge C may be clearly associated to a particular PSK device—e.g., C can be made available on the protective layer of a PSK device; or C may be stored in long-term memory of the PSK device and output when the PSK device is activated; and so on. Preferably, the challenge C is authenticated. For example, C may be specified using additional information I that is digitally signed together with the public key PK ultimately generated from C. This way, anyone needing to use a PSK device to, say, digitally sign a message M relative to PK, knows which challenge C to input to the PSK device to enable the PSK device to generate internally the corresponding secret key SK.

Multiple Secret Keys

The PSK device 600 is described above as safekeeping a single secret key SK. Let us now show that the PSK device 600 can protect different keys: SK1, SK2, . . . . In essence, SK1 is produced by giving the Weak PUV of the PSK device 600 a challenge C1. This way, the Weak PUV produces a random value D(C1), which is fed (possibly after being transformed by a function F) to hardware for the key generator G, which then produces a public key PK1 and a corresponding secret key SK1. Similarly, SK2 is produced by giving the Weak PUV the challenge C2. This way, the random value D(C2) is fed to the hardware for the key generator G, which then produces PK2 and SK2, and so on. The challenges C1, C2, etc. may be made available (possibly in an authenticated fashion), separately or together, by one or more entities.

Note also that the PSK device 600 may handle all kinds of secret keys, not just those of a digital signature scheme: for instance, without limitation intended, the decryption keys of a public-key cryptosystem.

Different Input/Output Means

For simplicity of description, we have described the PSK device 600 to have two separate external inputs: a challenge (fed directly to the Weak PUV of the PSK device 600) and a message (fed directly to the hardware for the signing algorithm S as one of two inputs). This is without limitation. For example, one can implement a PSK device having a single external input that is used to specify both the challenge and the message to the inside of the PSK device, where challenge and the message are then fed to the Weak PUV and S respectively.

Similarly, a PSK device may have a single external output, through which both the public key PK and a signed message are sent out.

To sign a message M, the PSK device needs to receive as inputs both the challenge C and the message M. However, to compute just the public key PK, the PSK device may just receive the challenge C. The PSK device may actually be constructed so as to work when receiving just the challenge input. Alternatively, the PSK device may only work when receiving both inputs and may only output PK and a signed message. Should a user desire to learn only PK, the user may just provide the PSK device with inputs C and any message x, and disregard the output signature.

Figure 6B:
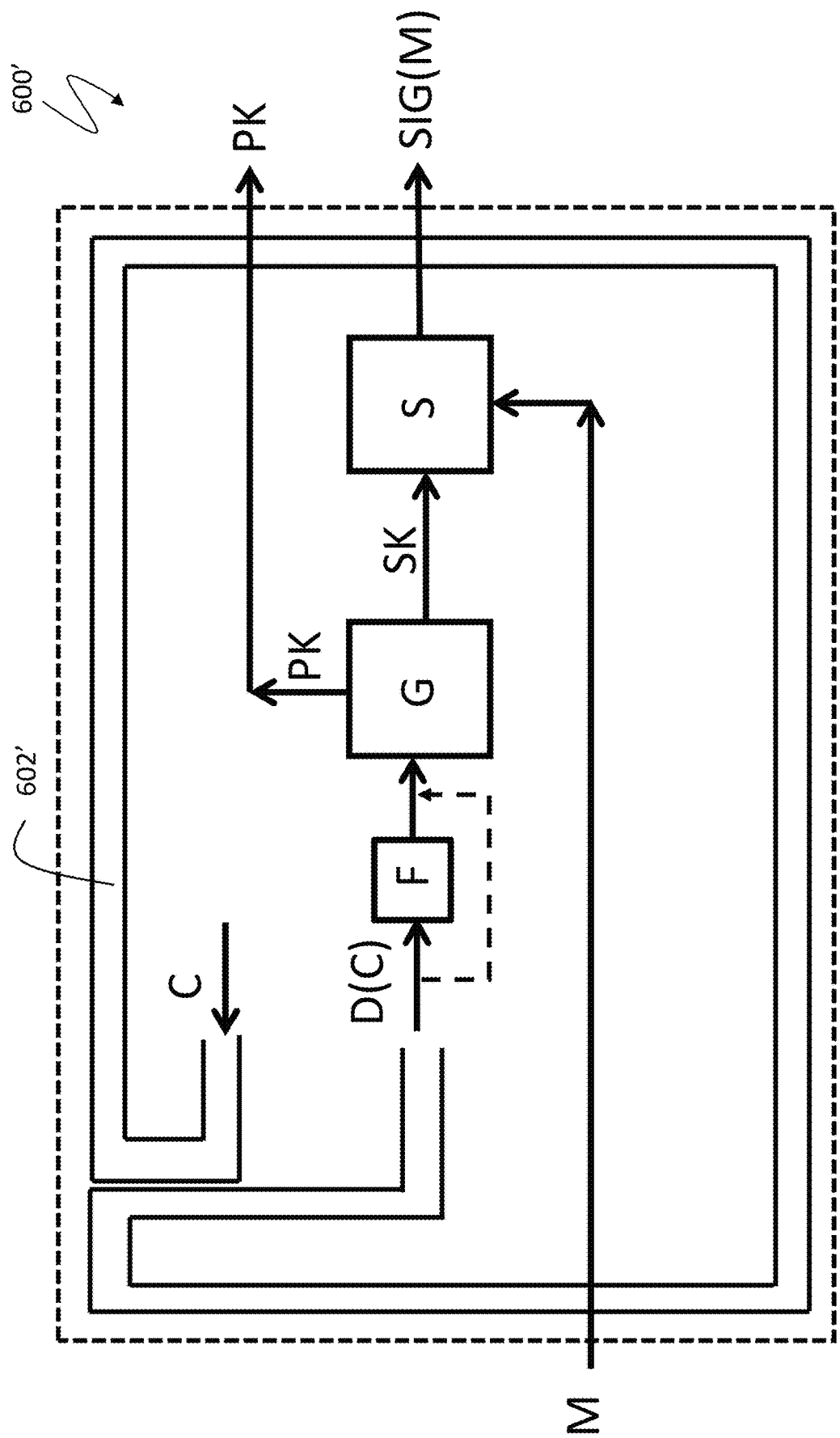

Referring to FIG. 6B, an alternative embodiment of a PSK device 600' shows a Weak PUV 602' that receives a challenge C as an internal input. In some cases, the challenge C may be generated and/or stored internally to the PSK device 600' and thus provided as an internal input to the PSK device 600'. Just as with the PSK device 600, discussed elsewhere herein, the Weak PUV 602' covers at least an output, D(C), produced by the Weak PUV 602', an optional transformation component that includes hardware that implements a transforming function F, a key generation component that includes hardware that implements a key-generation algorithm G, and a digital signature component that includes hardware that implements a digital signature algorithm S of a digital signature scheme.

1.3 Authorized PSK Devices

PSK devices may also be authorized by an entity E. Such an entity E securely associates the PSK device with some information I. Authorized PSK devices may be securely used by other parties. In an embodiment, an authorized PSK device works as follows:

Let PK be a public key generated by a PSK device. More precisely, let PK be a public key corresponding to a secret key ultimately generated by the key generator of the PSK device, once the PSK device is given a challenge C.

An authorizing entity E has a known public verification key $PK_E$ and secretly possesses a corresponding signing key, $SK_E$. The entity E produces and makes available the digital signature $SIG_E(PK, I)$, where I is any kind information (e.g., time information, the challenge C to be given to the PSK device for it to produce the secret key SK corresponding to PK, or no information). The signature $SIG_E(PK, I)$ signifies that E vouches for the authenticity of the information I relative to the PSK device capable of generating digital signatures relative to PK. If I is the empty information, then $SIG_E(PK)$ vouches just for the public key PK itself.

A variety of ways may be employed for E to learn the public PK that E needs to sign to authorize a PSK device. For instance, E itself may manufacture the PSK device and provide the PSK device with a particular challenge C and have the PSK device output PK. Alternatively, E may receive PK from an entity that E trusts.

A variety of ways may also be employed for E to make $SIG_E(PK, I)$ available. For instance, E may print $SIG_E(PK, I)$ (or have someone print $SIG_E(PK, I)$)—e.g., in bar code form—on the PSK device itself or separately (e.g., on an object to which PSK device is attached). Alternatively, the PSK device may receive $SIG_E(PK, I)$ (e.g., during an initial phase), store $SIG_E(PK, I)$ in non-volatile memory, and output $SIG_E(PK, I)$ later on (e.g., when digitally signing a message relative to PK).

Security Analysis

Note the digital signature $SIG_E(PK, I)$ securely binds information I with the public key PK of some PSK device, but the signature need not be securely bound to the PSK device. At worst, if the signature is separated from the PSK device, a user may not be able to verify the signatures produced by the PSK device, because the user does not know which public key PK must be used to verify the signatures. In fact, even if a malicious user makes $SIG_E(PK, I)$ available in connection with a different physical secure key PSK device', no one will be fooled into believing that E vouches for information I relative to the public key of the PSK device'. In fact, only the PSK device can reconstruct the secret key SK of PK. Thus, neither the PSK device' nor anyone else can forge any digital signature relative to PK.

Variants

Note that different entities, E1, E2, . . . , may authenticate the same public key PK of the PSK device, each with different information I so that E1 authenticates with I1, E2 authenticates with I2, etc.

Alternatively, different entities may authenticate different public keys produced by the same PSK device on different challenges. For instance, an entity Ej may produce the signature $SIG_{Ej}(PKj, Ij)$, where the public key PKj is produced by the PSK device on a challenge Cj.

1.4 Enhanced PSK Devices

As discussed elsewhere herein, basic PSK devices are secure against intrusive attacks. However, there is another class of attacks, generically referred to as "side-channel attacks", "physically observable attacks", or "key leakage", that are still possible. These attacks may occur when the same secret key SK is used multiple times (e.g., to digitally sign multiple messages, particularly if the messages may be chosen by a malicious user). For instance, the secret key SK might be discovered if the PSK device is linked to an outside power source and a malicious user can accurately and timely measure the power consumed by the PSK device when the PSK device digitally signs a bunch of messages using SK. Another attack may discover SK by accurately and timely measuring electromagnetic radiation emitted by the PSK device while digitally signing messages with SK.

It is important to protect a PSK device against these non-intrusive attacks whenever the PSK device is not kept at home or in some secure environment. In such a case, in fact, the PSK device may fall in the hands of a malicious user who can have the PSK device digitally sign very many messages with the same secret key SK, to allow the malicious user to measure anything during computations by the PSK device.

An enhanced PSK device is a PSK device that is also resilient to such non-intrusive attacks could be constructed from a basic PSK device that is supplemented with additional physical mechanisms. For instance, to prevent a malicious user from precisely measure the power absorbed by a basic PSK device at precise points in times during the computation of digital signatures with the same secret key SK, a PSK device could operate on an internal source of power (e.g., a battery). Alternatively, a PSK device may continue to operate relying on externally provided power, but the PSK device may be configured so that, when used to generate a public-secret key pair or to digitally sign a message, the PSK device also runs all kinds of other (unrelated) computations, so as to make it difficult for a malicious user to deduce SK from the power absorbed by the PSK device, because the power utilized by computation involving SK is masked by that utilized for all kinds of other computations.

Figure 7:
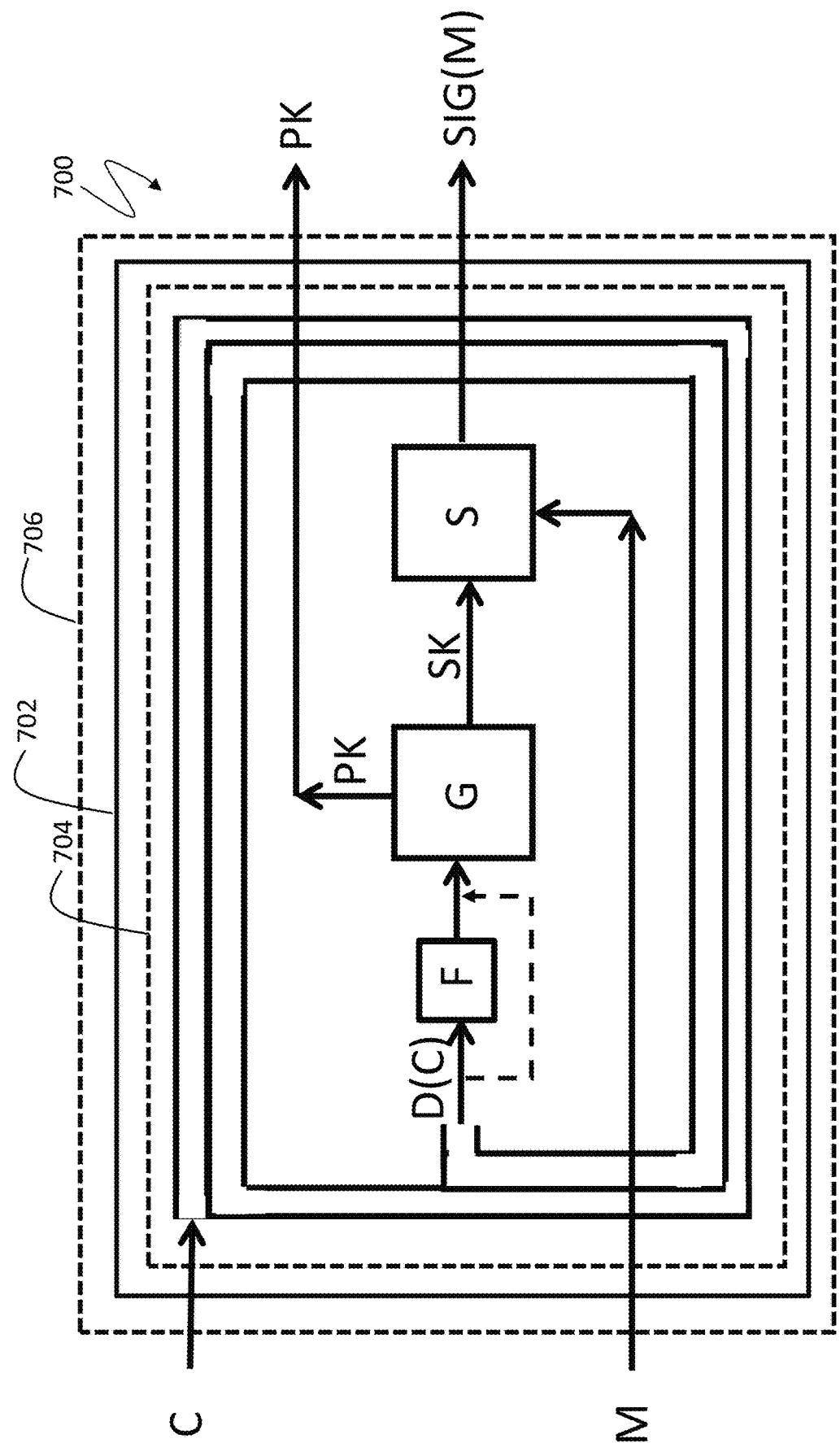
FIG. 7 is a schematic representation showing shows a PSK device with a Faraday cage between two protective layers according to an embodiment of the system described herein.

Referring to FIG. 7, a schematic rendition shows a PSK device 700 with a Faraday cage 702 between two protective layers 704, 706 to prevent a malicious user from learning SK by accurately and timely measure electromagnetic radiation emitted by a PSK device while signing multiple messages with SK. The Faraday cage 702 may ensure that a Weak PUV of the PSK device 700 does not get altered by normal use, while the removal of the Faraday cage 702 results in an alteration of the microstructure of the Weak PUV of the PSK device 700.

Enahnced PSK Device

In addition to (or instead of) the above physical methods, an enhanced PSK device may leverage physical aspects already present in a basic PSK device. Essentially, while preserving an ability of a basic PSK device to digitally sign very many messages, the same secret key SK may be prevented from being used over and over again. Note that, to be successful, the above mentioned non-intrusive attacks require that the same secret key SK is used sufficiently times to sign messages. Thus, inhibiting reuse of the same secret key SK may thwart such an attack.

The overall approach is as follows:
the PSK device uses different public-secret keys pairs, (PK1, SK1), (PK2, SK2), . . . .
a message is considered to be signed by the PSK device, if the message is signed relative to any of the public keys PK1 and
each key pair (and thus each secret key PK1) is used to sign only a limited number of messages, that is, a number low enough to prevent a malicious user from reconstructing SKi.

Without loss of generality, it is possible to have an enhanced PSK device: (1) digitally sign at most one message relative to each public key PK1; and (2) have one million such PK1's, and thus be able to sign up to one million messages. (Note that one million messages are more than enough for most application, and in fact more than enough for the applications explicitly discussed herein.)

A PSK device may have two distinct phases, an initialization phase followed by a usage phase (during which the PSK device behaves differently), and, in some cases, an authorization phase as well.

The Initialization Phase

In the initialization phase, the PSK device makes use of a sequence of different challenges, C1, C2, . . . , C1M, selected in any number of ways.

For instance, the different challenges may be standard and commonly known, and used by all PSK devices, or the different challenges may be selected differently for different PSK devices. The different challenges may be selected independently (e.g., at random) or in some organized fashion. For instance, C1 may be the binary string 0 . . . 0, C2 the binary string 0 . . . 01, C3 the binary string 0 . . . 010, and so on; or C1=H(C,1), C2=H(C,2), etc., where H is a cryptographic hash function. Or the different challenges may be selected internally (e.g., pseudo-randomly) by the PSK device on input of a single challenge C.

During the initialization phase, each challenge Ci is given as an external or an internal input to the PSK device, which then generates a public key PK1 with a corresponding secret key SKi. The key PK1 is output externally, while SKi is neither stored nor output, but simply generated and ignored. (In fact, during the initialization phase the hardware for the key generator G of the PSK device may function differently, so as to produce PK1 but not SKi, while in the usage phase the hardware for the key generator G of the PSK device may produce both or may produce only SKi.)

The Authentication Phase

During the authentication phase, a proper entity E, possessing a public verification key $PK_E$ of a digital signature scheme (together with a corresponding secret signing key), may digitally sign the public keys PK1 produced by the PSK device, either individually or together, possibly together with some additional information, such as a time information or any type of information, including no information at all. For instance, E may produce:

a signature $PK_E(PK_i, I_i)$ for each PKi, where $I_i$ is any information deemed useful, such as time information, information about the value i itself, the challenge Ci, or any other information, including no information.

a single collective signature: for instance, $SIG_E(PK_1, PK_2, \ldots, PK_{1M}, I)$ or $SIG_E(H(PK_1, \ldots, PK_{1M}), I)$— where I is any information deemed useful, or no information—or $SIG_E(H((PK_1, I_1), \ldots, (PK_{1m}, I_{1M})))$ where H is a cryptographic function, and in particular a Merkle hash function.

E's signature(s) are made available together with the PSK device, or stored within the PSK device, so that, during the usage phase, the PSK device can itself make the signature(s) available.

The Usage Phase

In the usage phase, the PSK device makes use of a counter (or similar), implemented in non-volatile memory. The counter may be implemented with a write-once memory. (Conceptually, such a counter may be thought as a paper ribbon with one million squares. Each time the counter is increased, the next square is punched, an operation that is easy to do but cannot be undone. Hence, the term "write-once" memory. The value of the counter is i if the first "unperforated" square is square number i. In an electronic circuit, punching a paper square is replaced by other means: e.g., burning a fuse.)

When a user wants to have the PSK device sign a message, the user activates the PSK device that responds by (a) reading the current value of the counter, i, (b) outputting information enabling the user to learn the challenge Ci that the user must use to have the PSK device digitally sign the message. Note that, if the sequence of authenticated challenges are available outside the PSK device, the PSK device may just output i, or Ci. If the authenticated challenges are stored within the PSK device, then the PSK device can retrieve and output the authenticated Ci. And so on.

To obtain the digital signature, the user inputs the challenge Ci to the PSK device and the message M the user wants to have signed. In response, the PSK device may do the following:

1. Computes an output, D(Ci), of the Weak PUV
2. Computes F(D(Ci)) (if transformation component is being used) and feeds F(D(Ci)) (or D(Ci)) if no transformation component is used) as an input to hardware in the PSK device for the key generator G so as to compute PK1 and Ski
3. Feeds the hardware for the signing algorithm S with inputs M and SKi, to compute a digital signature of M, $SIG_i(M)$
4. Outputs externally PK1 and $SIG_i(M)$, possibly with the value i itself, and
5. Increases the value of the counter (e.g., by 1).

If the PSK device is also responsible for making available the certified public key PK1, the PSK device also outputs the relevant stored digital signature of E about PK1 and possibly any corresponding relative information that is authenticated by E. For instance, when the PSK device is activated, the PSK device may output the digital signature $SIG_E(PK_i, I_i)$ and $I_i$ may include the challenge Ci.

Signature Verification

To verify the so produced signature $SIG_i(M)$ of PSK device, a user does the following:

First verifies that $SIG_i(M)$ is indeed a valid digital signature of M relative to the public PK1 and Second, verifies the digital signature of PK1 produced and made available by E. For instance, the user may verify the digital signature $SIG_E(PK_i, I_i)$ relative to E's public key, $PK_E$.

Security Analysis

Note that a user need not verify whether $SIG_i(M)$ is the ith signature produced by the PSK device. In fact, the PSK device may have been used by different people and one cannot be sure of how many prior messages the PSK device has signed (particularly if the PSK device does not specify the current value of the counter of the PSK device). It is the PSK device that enforces that no message is signed relative to the same public key to thus avoid using the same secret key.

Also note that the current counter value is stored in some internal memory cell that is not easily readable or re-settable by a malicious user without altering the microstructure of the Weak PUV of the PSK device. Moreover, as soon as the PSK device reconstructs the secret key SKi to digitally sign the ith message, the PSK device also increases the counter value from i to i+1. Thus, a malicious user cannot force the PSK device to compute more and more digital signatures relative to each SKi, so as to become able (in absence of a Faraday cage) to reconstruct SKi from the electromagnetic radiation emitted by the PSK device while signing multiple message with SKi. In addition, implementing the counter via a write-once memory prevents the possibility of winding back the counter value.

After learning the public key PK1—e.g., via the digital signature $SIG_E(PK_i, I_i)$—a malicious user might manufacture an arbitrary number of fake PSK devices, each resembling the original PSK device from the outside, and make available the same signature $SIG_E(PK1, I_i)$. Nevertheless, the malicious user cannot produce the digital signature of the i-th message signed by the original PSK device. In fact, a malicious user cannot forge the signature of any message that has not been signed by the original PSK device, because the malicious user cannot learn any of the secret signing keys ephemerally reconstructed and used by the original PSK device.

Of course, a malicious user can manufacture a new PSK', which is perfectly capable of signing any message M relative to any of the public keys $PK_i'$ of the malicious user. However, the malicious user will not be able to forge the signature of E of $PK_i'$ (together with some additional information $I_i'$), because the malicious user does not know the secret signing key of E. Thus no one should be fooled into believing that PSK' has been authorized by E.

2 PSK Device Applications

Non-Counterfeitable Banknotes

Essentially, a non-counterfeitable banknote is a PSK device (preferably manufactured by a trusted facility) authorized by a proper entity E (e.g., a central bank or another entity acting on its behalf). To produce such a banknote worth, say, $100, the proper entity produces and makes available the signature $SIG_E(PK, I)$, where PK is the public key generated by a PSK device on challenge C (e.g., a standard value), and I indicates the value $100 and possibly additional information, such as a serial number, an issue date, an expiration date after which the PSK device loses its monetary value, the challenge C (if the value of C is not standard), etc.

Figure 8:
FIG. 8 illustrates a banknote with a PSK device and an alphanumeric string printed thereon according to an embodiment of the system described herein.

Referring to FIG. 8, a banknote 800 is shown with a PSK device 802 and an alphanumeric string 804 printed thereon. Since the PSK device 802 may be small and easy to lose, the entity, E, that produced the banknote 800 may have the PSK device 802 attached (though not necessarily securely) to a convenient medium, such as the banknote 800, which has the look and feel of a traditional $100 bill, so as to enable one to use visual inspection to ascertain the validity of the banknote 800. In this case, a possible way to make $SIG_E(PK, I)$ easily available is printing it on the same medium carrying the PSK device 802—e.g., in some bar-code format, or as the alphanumeric string 804 shown in FIG. 8.

A user can verify the banknote 800 and the monetary value thereof by:

Verifying the digital signature $SIG_E(PK, I)$ relative to the public key $PK_E$ Verifying that I specifies the monetary value $100 (and that any other information I may include is in order)

Providing the PSK device 802 with a challenge C and some message M (preferably, a string randomly selected for the occasion) so as to obtain a digital signature of M relative to PK, Verifying that the PSK device 802 indeed outputs a digital signature of M relative to the public key PK authenticated by the entity that produced the banknote 800.

Note that it is in the verifier's interest to choose a message M never used before. Indeed, if every user presented the PSK device 802 with a standard message SM to digitally sign, then a malicious user may:

(a) copy the digital signature $SIG_E(PK, I)$ of the entity, E, that produced the banknote 800

(b) get a digital signature of SM relative to public key PK, sig, generated by the original PSK device (c) manufacture a secret-less device PSK device' that outputs sig on input SM, and (d) make $SIG_E(PK)$ available together with PSK device'.

By doing so, the malicious user essentially fools a verifying user into believing that the fake PSK device' is a valid $100 banknote. By contrast, if M has never been signed before (e.g., because it is random and sufficiently long) the above attack fails miserably, because the fake PSK device' does not know the secret key SK necessary to produce a digital signature of M relative to PK.

Having the entity that produced the banknote 800 use the same challenge C for all banknotes certainly makes it easy for a banknote verifier to know which challenge to use. However, the entity that produced the banknote 800 may use a different challenge C for each public key PK of each PSK device, and make C available (e.g., in the I of $SIG_E(PK, I)$).

Note also that it is possible to securely attach multiple PSK devices to a single banknote to guard against the possibility of a failed PSK device causing the banknote to lose its monetary value. As long as at least one (or some subset) of the PSK devices work, the banknote is deemed authentic and retains its value. Any attempt by a malicious user to transfer a working PSK device to a counterfeit banknote alters the microstructure of the working PSK device and/or alters the paper of the original banknote in very visible ways, thus thwarting the malicious user.

Object Authentication

An entity E with a public verification key $PK_E$ may authenticate information A about an object (broadly defined) by:

securely attaching (e.g., by means of a special glue) a PSK device with public key PK to the object and producing and making available a digital signature $SIG_E$ (PK, I), wherein information I includes information that E wishes to authenticate about the object, and possibly additional data. For instance, I may also specify the challenge C that one must give as input to PSK device for causing the PSK device to internally produce the secret signing key corresponding to PK.

The PSK device is securely attached to the object in a way so that any attempt to remove the PSK device from the object results in breaking the PSK device or altering the microstructure of the Weak PUV of the PSK device, so that there is no longer a way, for the PSK device or anyone else, to reconstruct the secret key SK corresponding to PK.

Note that if securely attaching the PSK device to an object alters the microstructure of the Weak PUV of the PSK device, then the input-output function of the Weak PUV may be determined after the secure attachment has happened. Similarly, the public key PK and a corresponding secret key SK are those that may be internally derived by the PSK device, via the Weak PUV after the secure attachment has occurred.

To verify the so authenticated information A about an object that has been authenticated by an entity E (i.e., the producer, manufacturer, seller, etc.), a user may, in some order:

Verify the digital signature $SIG_E(PK, I)$ relative to the public key $PK_E$

Verify that I specifies the information A

Provide the PSK device with a challenge C and some message M (e.g., a string randomly selected for the occasion) and Verify the digital signature of M produced by the PSK device relative to the public key PK authenticated by E.

Just as with non-counterfeitable banknotes, discussed above, it is in the interest of the verifier to choose a message M that has never been used before. Indeed, if every user asked the PSK device to digitally sign a standard message SM, then a malicious user may:

(a) copy E's digital signature $SIG_E(PK, I)$ (b) obtain a digital signature of SM relative to the public key PK, sig, produced by the original PSK device (e.g., by purchasing a non-counterfeit object, or by asking to verify the authenticity of a non-counterfeit object prior to purchasing it)

(c) manufacture a secret-less device PSK device' that always outputs sig on input SM (d) make $SIG_E(PK)$ available together with PSK device' and (e) attach (not necessarily securely) the PSK device' to a counterfeit object.

By performing the steps above, a malicious user essentially fools a verifier into believing that the entity E has authenticated information A for the counterfeit object. By contrast, if M has never been signed before (which is practically the case when M is chosen at random and sufficiently long) this attack fails miserably, because the fake device PSK device' does not know the secret key SK necessary to produce a digital signature relative to public key PK of the genuine PSK device.

Note that a verifier need not verify that the PSK device is securely attached to the object. However, it is in the interest of E to have the PSK device securely attached to the object.

Note also that it is possible to securely attach multiple PSK devices to a single object to guard against the possibility on some PSK devices failing. As long as at least one (or some subset) of the PSK devices work, the object is deemed authentic and so is any authenticated information about the object. Notice that having multiple PSK devices to authenticate a single object makes the system more resilient, without enabling one to use some the extra PSK devices to authenticate a fake object. In fact, detaching a working PSK device from an authentic object to place the working PSK device (possibly together with some fake PSK devices) on a fake object will not authenticate the fake object, because the microstructure of the detached working PSK device will be altered by the act of detaching the working PSK device.

Figure 9:
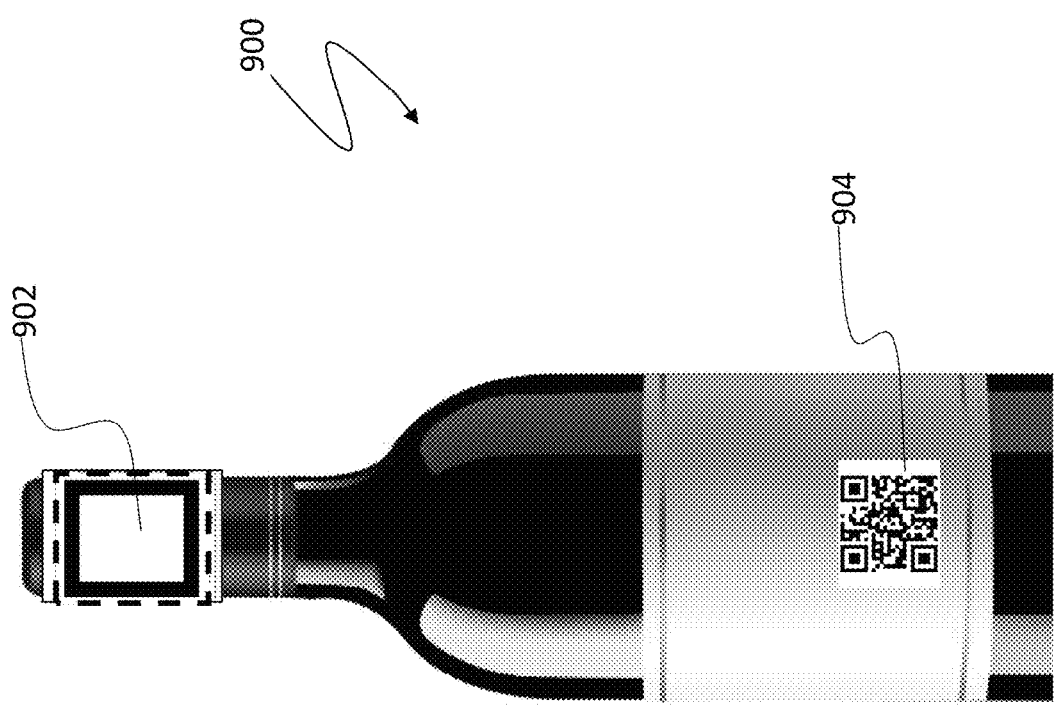
FIG. 9 illustrates a wine bottle with a PSK device and a QR code according to an embodiment of the system described herein.

Referring to FIG. 9, the object-authentication system is shown being used on an alimentary product, in this case a wine bottle 900. A producer of the wine (or an entity acting on behalf of the producer of the wine) securely attaches a PSK device 902 to the wine bottle 900 so that the wine bottle 900 cannot be opened without altering the functionality of the PSK device 902 (i.e., damaging or altering a Weak PUV of the PSK device 902, as described elsewhere herein). The wine bottle 900 also includes a label having a QR code 904 (or similar mechanism for conveying information, including printed information in clear text). The QR code 904 may provide information that specifies the year of production, date of harvest, grape composition, and any (other information deemed important). In some cases, the QR code 904 may also include a digital signature of a message that includes the information that may be verified using the PSK device 902. In some instances, the QR code 904 may also include the challenge used to verify the PSK device 902, although the challenge may be obtained from other sources, as described elsewhere herein.

Figure 10:
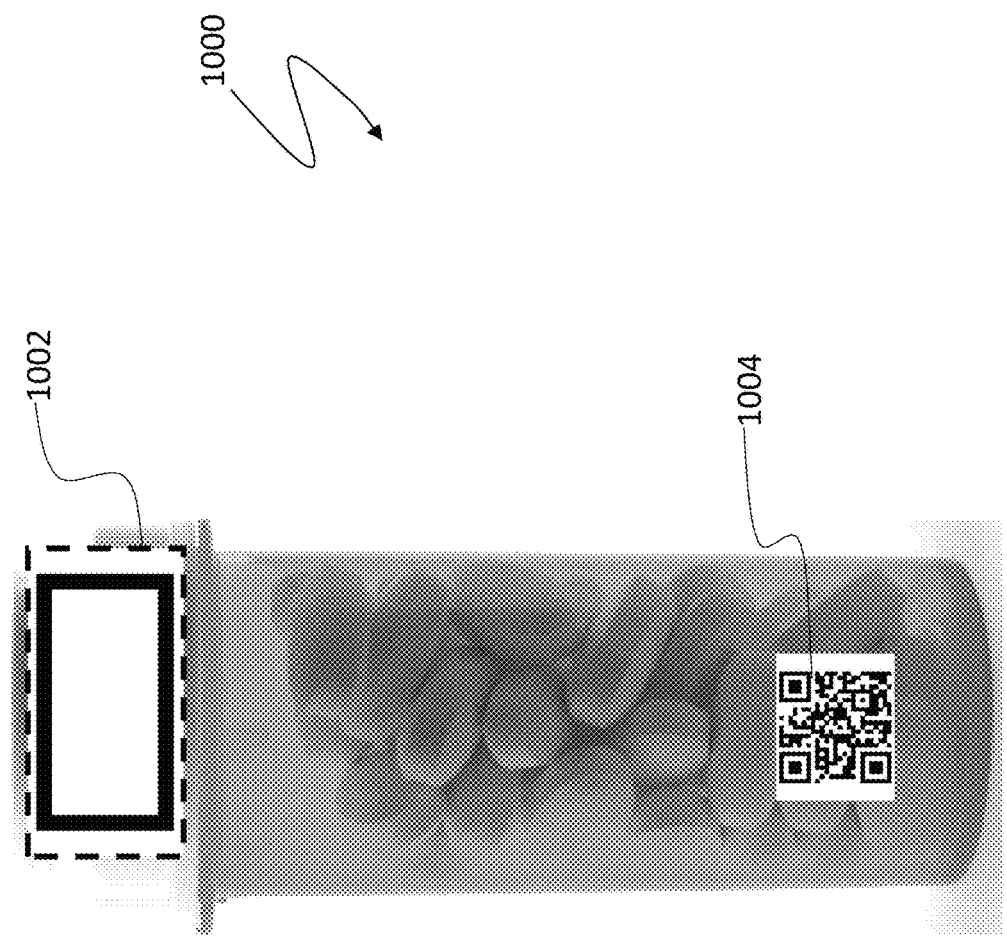
FIG. 10 illustrates a bottle containing a medicinal drug with a PSK device and a QR code according to an embodiment of the system described herein.

Referring to FIG. 10, the object-authentication system is shown being used on a bottle 1000 containing medicinal drug. The pharmaceutical company (or an entity acting on behalf of the pharmaceutical company) securely attaches a PSK device 1002 to the bottle 1000 so that the bottle 1300 cannot be opened without altering the functionality of the PSK device 1002 (i.e., damaging and/or altering a Weak PUV of the PSK device 1002, as described elsewhere herein). The bottle 1000 also includes a label having a QR code 1004 (or similar). The QR code 1004 may provide information that specifies the composition of the drug, an expiration date, possible side-effects, and any other information deemed important to be authenticated. In some cases, the QR code 1004 may also include a digital signature of a message that includes the information that may be verified using the PSK device 1002. In some instances, the QR code 1004 may also include the challenge used to verify the PSK device 1002, although the challenge may be obtained from other sources, as described elsewhere herein.

Figure 11:
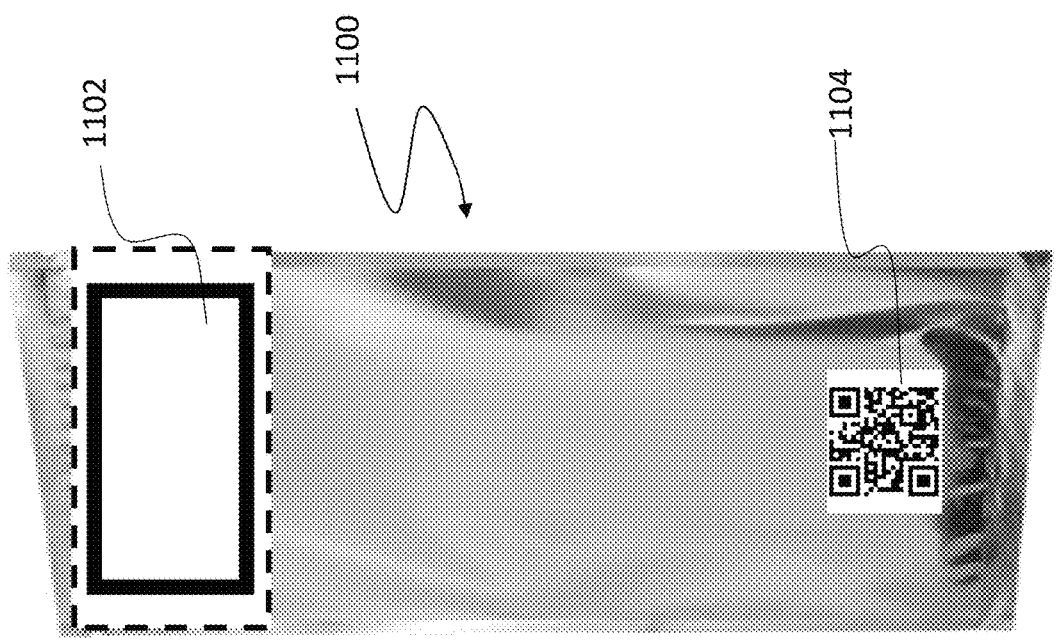
FIG. 11 illustrates a sealed package with a PSK device and a QR code according to an embodiment of the system described herein.

Referring to FIG. 11, the object-authentication system is shown being used on a sealed package 1100. The entity that sealed the package (or an entity acting on behalf of the entity that sealed the package) securely attaches a PSK device 1102 to the package 1100 so that the package 1100 cannot be opened without altering the functionality of the PSK device 1102 (i.e., damaging and/or altering a Weak PUV of the PSK device 1102, as described elsewhere herein).

The package 1100 also includes a label having a QR code 1104 (or similar) that may provide information that specifies the contents of the package 1100, the date the package was sealed, and any other information deemed important to be authenticated. In some cases, the QR code 1104 may also include a digital signature of a message that includes the information that may be verified using the PSK device 1102. In some instances, the QR code 1104 may also include the challenge used to verify the PSK device 1102, although the challenge may be obtained from other sources, as described elsewhere herein.

Figure 12:
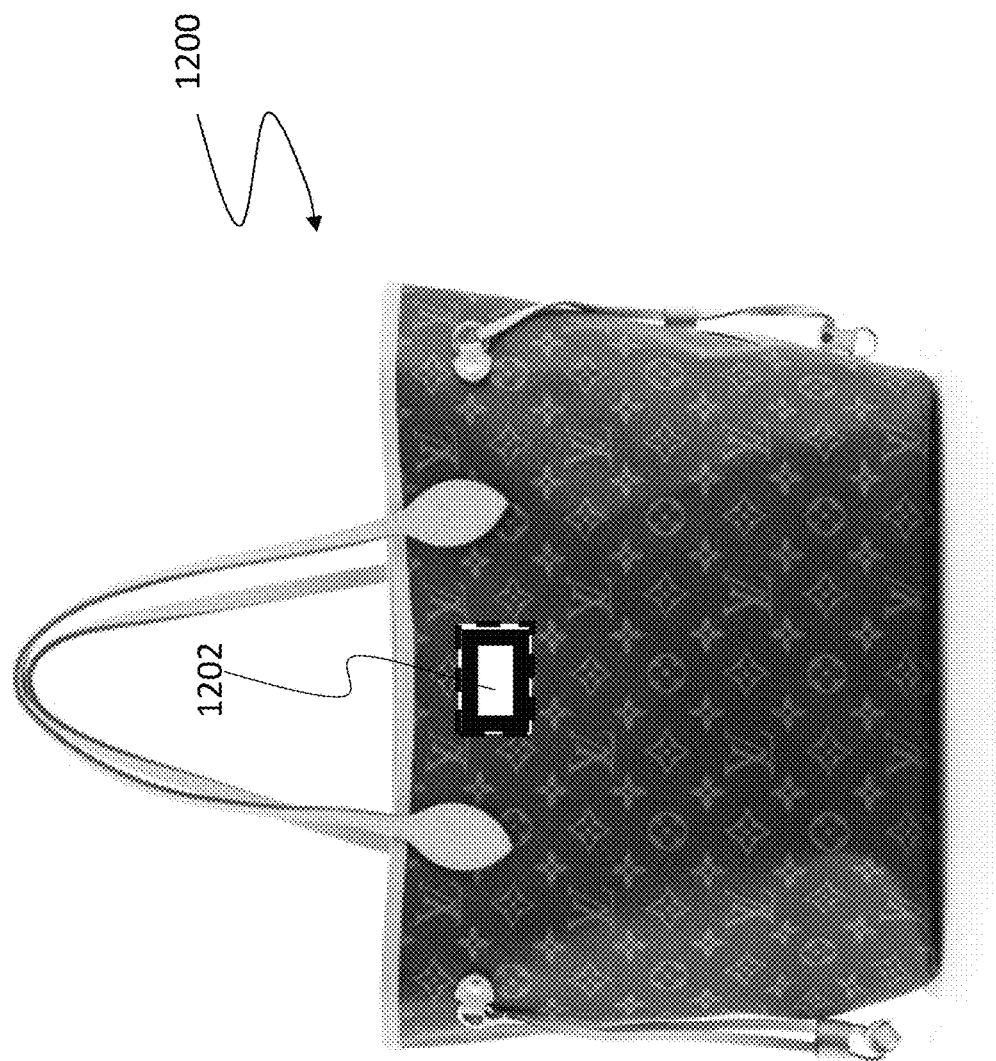
FIG. 12 illustrates an expensive consumer item with a PSK device attached thereto according to an embodiment of the system described herein.

Referring to FIG. 12, the object-authentication system is shown being used on a consumer item 1200, such as a woman's handbag produced by Louis Vuitton. The manufacturer (or an entity acting on behalf of the manufacturer) securely attaches a PSK device 1202 to the consumer item 1200 so that PSK device 1202 cannot be removed or replaced without altering the functionality of the PSK device 1202 (i.e., damaging and/or altering a Weak PUV of the PSK device 1202, as described elsewhere herein) and/or damaging the consumer item 1200. The PSK device 1202 may also have information printed thereon or associate therewith including warranty information, the name of the producer, number of copies produced, and/or any other information deemed useful/important. In some cases, the information may also include a digital signature of a message that includes the information that may be verified using the PSK device 1202. In some instances, information may also include the challenge used to verify the PSK device 1202, although the challenge may be obtained from other sources, as described elsewhere herein. Note also that, instead of a manufacturer or entity acting on behalf of a manufacturer attaching the PSK device 1202, a government official or an entity acting on behalf of a government official could attach the PSK device 1202 to products produced in a given country (e.g., "made in Italy") and may associate with the PSK device 1202 any other information deemed appropriate.

Generally, the object-authentication system may be used in connection with any item for which authentication is to be maintained, such as a manufactured component of a machine or system. For example, aircraft parts are manufactured to specific standards that guarantee their safety but also increase the cost of the parts. In some cases, counterfeit parts are fraudulently sold to unsuspecting recipients with disastrous consequences, including aircraft failure and loss of life.

In the examples of FIGS. 8-12, a malicious user cannot fabricate a fake object and convince anyone else (e.g., a customer) that the customer is dealing with an authentic object or that any authenticated information applies to the fake object. Even if the malicious user purchases or manufactures a PSK device' capable of digitally signing messages relative to a public key PK' and attaches PSK device' to a fake object, the malicious user cannot forge the digital signature of the manufacturer/producer (or an entity on behalf of the manufacturer/producer) because the digital signature of the manufacturer/producer (or the entity on behalf of the manufacturer/producer) is relative to PK, the public key for the corresponding genuine PSK device. Thus, the malicious user cannot fool someone into believing that the manufacture/producer (or the entity on behalf of the manufacturer/producer) vouches for any information A about the fake object.

Note that a malicious user may detach a PSK device from a genuine object, attach the PSK device to a fake object, and may make available the same digital signature $SIG_E(PK, I)$ produced by the manufacture/producer (or the entity on behalf of the manufacturer/producer) for the original object. However, after being detached from the genuine object, the microstructure of the Weak PUV of PSK device has been altered, and thus can no longer be used to generate the secret key SK corresponding to the public key PK specified in $SIG_E(PK, I)$, as described elsewhere herein.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions.

Software implementations of the system described herein may include executable code that is stored in a computer readable medium. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A security device, comprising:
  a covering device that, in response to an input signal, consistently provides a random output signal that varies according to a microstructure of the covering device, wherein altering the microstructure of the covering device alters the random output signal and wherein modifying the covering device or detaching the security device from an object alters the microstructure of the covering device, the object being at least one of: a banknote, a consumer item, a manufactured component, a pharmaceutical product, an alimentary product, and a packet with content;
  a key generation component that generates a secret key based on the random output signal; and
  a digital signature component that produces a digital signature of a message received by the security device using the secret key, wherein the covering device surrounds at least a portion of the key generation component and the digital signature component to prevent access thereto and wherein accessing any of the components alters the microstructure of the covering device to alter the random output signal, wherein the secret key exists only long enough to sign the message.

2. A security device according to claim 1, further comprising:
  a protective layer disposed on one or more outer surfaces of the security device to prevent the microstructure of the covering device from being altered under normal use of the security device.

3. A security device according to claim 2, wherein the protective layer is used to attach the security device to an object and wherein detaching the security device from the object alters the microstructure of the covering device.

4. A security device according to claim 1, wherein an entity digitally signs a public key corresponding to the secret key together with additional information that specifies at least one of: the input signal to the covering device and information about the object.

5. A security device according to claim 1, wherein additional security devices are attached to the object.

6. A security device according to claim 1, wherein an entity digitally signs a public key corresponding to the secret key together with some information and wherein a digital signature of the entity together with the security device constitute a given monetary value.

7. A security device, according to claim 1, wherein the input signal is authenticated by an entity.

8. A security device according to claim 1, further comprising:
  a Faraday cage disposed about the security device.

9. A security device according to claim 1, wherein the key generation component also generates a public key corresponding to the secret key.

10. A security device according to claim 9, wherein the security device outputs the public key.

11. A security device according to claim 1, wherein the input signal is one of a plurality of challenge values stored in the security device.

12. A security device according to claim 11, wherein one of the input signals is chosen according to an internal counter of the security device.

13. A security device according to claim 1, further comprising:
  a transformation component disposed between the covering device and the key generation component.

14. A security device according to claim 13, wherein the transformation component uses one of: a cryptographic hash function or an identity function to transform the random value signal.

15. A security device according to claim 1, wherein the security device runs unrelated computations when digitally signing a message.

16. A method of digitally signing a message, comprising:
  providing the message to a security device having a covering device that, in response to an input signal, consistently provides a random output signal that varies according to a microstructure of the covering device, wherein altering the microstructure of the covering device alters the random output signal and wherein modifying the covering device or detaching the security device from an object alters the microstructure of the covering device, the object being at least one of: a banknote, a consumer item, a manufactured component, a pharmaceutical product, an alimentary product, and a packet with content, the security device also having a key generation component that generates a secret key based on the random output signal and a digital signature component that produces a digital signature of a message received by the security device using the secret key, wherein the covering device surrounds at least a portion of the key generation component and the digital signature component to prevent access thereto and wherein accessing any of the components alters the microstructure of the covering device to alter the random output signal and the secret key exists only long enough to sign the message;

providing a challenge value to the security device; and obtaining a digital signature from the security device.

17. A method of digitally signing a message, according to claim 16, further comprising:

an entity digitally signing a public key corresponding to the secret key.

18. A method of digitally signing a message, according to claim 17, wherein a digital signature of the entity together with the security device constitute a given monetary value.

19. A method of digitally signing a message, according to claim 16, wherein the input signal is authenticated by an entity.

20. A method of digitally signing a message, according to claim 16, further comprising:

the key generation component also generating a public key corresponding to the secret key.

21. A method of digitally signing a message, according to claim 20, further comprising:

the security device outputting the public key.

22. A method of digitally signing a message, according to claim 16, further comprising: the wherein a transformation component, disposed between the covering device and the key generation component, uses using one of: a cryptographic hash function or an identity function to transform the random value signal.

23. A method of digitally signing a message, according to claim 16, further comprising:

the security device running unrelated computations while digitally signing a message.

* * * * *